United States Patent
Lu et al.

(10) Patent No.: US 11,494,450 B2
(45) Date of Patent: Nov. 8, 2022

(54) PROVIDING RECOMMENDED CONTENTS

(71) Applicant: Microsoft Technology Licensing, LLC, Redmond, WA (US)

(72) Inventors: Yumao Lu, Bellevue, WA (US); Yongjian Deng, Redmond, WA (US); Linjun Shou, Haidian (CN); Wenbin Cai, Haidian (CN); Jun Pan, Redmond, WA (US); Jie Zhou, Haidian (CN); Baoquan Fan, Haidian (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 539 days.

(21) Appl. No.: 16/342,436

(22) PCT Filed: Nov. 30, 2016

(86) PCT No.: PCT/CN2016/108151
§ 371 (c)(1),
(2) Date: Apr. 16, 2019

(87) PCT Pub. No.: WO2018/098751
PCT Pub. Date: Jun. 7, 2018

(65) Prior Publication Data
US 2020/0057786 A1    Feb. 20, 2020

(51) Int. Cl.
*G06F 16/00*    (2019.01)
*G06F 16/9535*    (2019.01)
*G06F 16/9538*    (2019.01)

(52) U.S. Cl.
CPC ...... *G06F 16/9535* (2019.01); *G06F 16/9538* (2019.01)

(58) Field of Classification Search
None
See application file for complete search history.

(56) References Cited

U.S. PATENT DOCUMENTS

| 6,556,983 B1 | 4/2003 | Altschuler et al. |
| 8,239,397 B2 | 8/2012 | Stefik et al. |

(Continued)

FOREIGN PATENT DOCUMENTS

| CN | 101359332 A | 2/2009 |
| CN | 101960444 A | 1/2011 |

(Continued)

OTHER PUBLICATIONS

Bawab, et al., "Finding Trending Local Topics in Search Queries for Personalization of a Recommendation System", In Proceedings of the 18th ACM SIGKDD international conference on Knowledge discovery and data mining, Aug. 12, 2012, pp. 397-405.

(Continued)

*Primary Examiner* — Debbie M Le
(74) *Attorney, Agent, or Firm* — Schwegman Lundberg & Woessner, P.A.

(57) ABSTRACT

A method and apparatus for providing recommended contents. The method comprises: A search query being received; an event being selected from a predetermined event set based on the search query; the recommended contents being provided in a structured template including one or more elements; each element is associated with a feature of the event; each feature of the event corresponds to a search intent. Each element includes one or more sub-contents, and each sub-content is correlated to corresponding recommended contents.

20 Claims, 8 Drawing Sheets

(56) References Cited

U.S. PATENT DOCUMENTS

| | | | |
|---|---|---|---|
| 8,832,301 B2* | 9/2014 | Graff | G06F 16/9537 709/231 |
| 9,087,090 B1* | 7/2015 | Cormier | G06F 16/86 |
| 9,195,635 B2 | 11/2015 | Liu et al. | |
| 9,298,678 B2 | 3/2016 | Chakerian et al. | |
| 9,529,913 B2* | 12/2016 | McKenzie | G06F 16/215 |
| 10,182,250 B2* | 1/2019 | Krueger | H04N 21/6582 |
| 10,740,415 B2* | 8/2020 | Zhong | G06F 16/9535 |
| 10,949,479 B2* | 3/2021 | Li | G06F 16/9566 |
| 11,036,812 B2* | 6/2021 | Ravi | G06F 16/9535 |
| 2008/0294663 A1 | 11/2008 | Heinley et al. | |
| 2011/0093331 A1* | 4/2011 | Metzler | G06Q 30/0251 705/14.49 |
| 2011/0179017 A1 | 7/2011 | Meyers et al. | |
| 2011/0302153 A1* | 12/2011 | Meretakis | G06F 16/951 707/722 |
| 2012/0166438 A1 | 6/2012 | Wu et al. | |
| 2012/0179751 A1 | 7/2012 | Ahn et al. | |
| 2013/0311485 A1 | 11/2013 | Khan | |
| 2014/0372425 A1 | 12/2014 | Ayoub et al. | |
| 2015/0113018 A1 | 4/2015 | Steed et al. | |
| 2015/0193542 A1 | 7/2015 | Colcernian et al. | |
| 2015/0227517 A1 | 8/2015 | Lymberopoulos et al. | |
| 2015/0278355 A1 | 10/2015 | Hassanpour et al. | |
| 2016/0085804 A1 | 3/2016 | Chadha et al. | |
| 2017/0099592 A1* | 4/2017 | Loeb | H04L 67/303 |
| 2017/0206253 A1* | 7/2017 | Wang | G06F 16/24575 |
| 2019/0278776 A1* | 9/2019 | Villafañe | G06F 16/9535 |
| 2020/0034488 A1* | 1/2020 | Ravi | G06F 16/3349 |
| 2021/0011967 A1* | 1/2021 | Rathod | G06F 16/9537 |

FOREIGN PATENT DOCUMENTS

| | | |
|---|---|---|
| CN | 102207948 A | 10/2011 |
| CN | 102646114 A | 8/2012 |
| CN | 102902711 A | 1/2013 |
| WO | 2007103096 A3 | 8/2008 |

OTHER PUBLICATIONS

"International Search Report and Written Opinion Issued in PCT Application No. PCT/CN2016/108151", dated Jul. 27, 2017, 11 Pages.

"Supplementary Search Report Issued in European Patent Application No. 16922719.6", dated Mar. 30, 2020, 9 Pages.

"First Office Action and Search Report Issued in Chinese Patent Application No. 201680081240.6", (w/ English Translation), dated Mar. 24, 2021, 16 Pages.

"Office Action Issued in European Patent Application No. 16922719.6", dated Oct. 26, 2021, 8 Pages.

Lempel, et al., "Predictive Caching and Prefetching of Query Results in Search Engines", In Proceedings of the 12th International Conference on World Wide Web., May 20, 2003, pp. 19-28.

"Second Office Action Issued in Chinese Patent Application No. 201680081240.6", dated Nov. 29, 2021, 9 Pages.

"Office Action Issued in Indian Patent Application No. 201917018346", dated Dec. 6, 2021, 6 Pages.

"Office Action Issued in Chinese Patent Application No. 201680081240.6", dated Mar. 31, 2022, 9 Pages.

* cited by examiner

PROVIDING RECOMMENDED CONTENTS

CROSS-REFERENCE TO RELATED APPLICATIONS

This application is a U.S. National Stage Filing under 35 U.S.C. 371 of International Patent Application Serial No. PCT/CN2016/108151, filed November 302016, and published as WO 2018/098751 A1 on Jun. 7, 2018, which application and publication are incorporated herein by reference in their entirety.

BACKGROUND

Nowadays, search service is widely used by network users for obtaining network contents that they are interested in. For example, when an event happens, a network user may try to search network contents relevant to the event through a search engine. The event herein may refer to various affairs with at least time attribute and location attribute happening in the human society or the natural world. For example, the event may be a political event, a sports event, an entertainment event, a traffic accident, a natural disaster, etc. happening in a particular time and in a particular location. Upon receiving a search query from a terminal device of the network user, the search engine may provide the network user with a search result which contains network contents relevant to the event. For example, the network contents may include some news or reports on the event determined or recommended by the search engine based on the search query from the network user. Usually, the network contents are provided by the search engine based on considerations of relevance, freshness and authority.

SUMMARY

This Summary is provided to introduce a selection of concepts in a simplified form that are further described below in the Detailed Description. It is not intended to identify key features or essential features of the claimed subject matter, nor is it intended to be used to limit the scope of the claimed subject matter.

Embodiments of the present disclosure may provide method, apparatus and system for providing recommended contents.

In an aspect, the present disclosure provides a method for providing recommended contents. A search query may be received. An event may be selected from a predetermined event set based on the search query. The recommended contents may be provided in a structured template including one or more elements. Each element is associated with a feature of the event. Each feature of the event corresponds to a search intent. Each element includes one or more sub-contents, and each sub-content is correlated to corresponding recommended contents.

In another aspect, the present disclosure provides a method for providing recommended contents. An event may be identified based on a plurality of search queries which are spiking within a period. One or more features of the event may be determined. Each feature of the event corresponds to a search intent. The recommended contents are provided in a structured template including one or more elements. Each element is associated with a feature of the event, and each element includes one or more sub-contents. Each of the sub-contents may be correlated with corresponding recommended contents.

In another aspect, the present disclosure provides an apparatus for providing recommended contents. The apparatus may comprise: a query receiving module, for receiving a search query; an event selecting module, for selecting an event from a predetermined event set based on the search query; and a content providing module, for providing the recommended contents in a structured template including one or more elements, each element being associated with a feature of the event, each feature of the event corresponding to a search intent, each element including one or more sub-contents, and each sub-content being correlated to corresponding recommended contents.

In another aspect, the present disclosure provides an apparatus for providing recommended contents. The apparatus may comprise: an event identifying module, for identifying an event based on a plurality of search queries which are spiking within a period; a feature determining module, for determining one or more features of the event, each feature of the event corresponding to a search intent, the recommended contents being provided in a structured template including one or more elements, each element being associated with a feature of the event, and each element including one or more sub-contents; and a content correlating module, for correlating each of the sub-contents with corresponding recommended contents.

In another aspect, the present disclosure provides a system for providing recommended contents. The system may comprise one or more processors. The system may further comprise a memory that is connected with the one or more processors. The memory may store computer-executable instructions that, when executed, cause the one or more processors to perform any operations of the methods for providing recommended contents according to the embodiments of the present disclosure.

In another aspect, the present disclosure provides a non-transitory computer-readable medium. The non-transitory computer-readable medium may comprise instructions that, when executed, cause one or more processors to perform any operations of the methods according to various aspects of the present disclosure.

It should be noted that the above one or more aspects comprise the features hereinafter fully described and particularly pointed out in the claims. The following description and the drawings set forth in detail certain illustrative features of the one or more aspects. These features are only indicative of a few of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Figure 1:
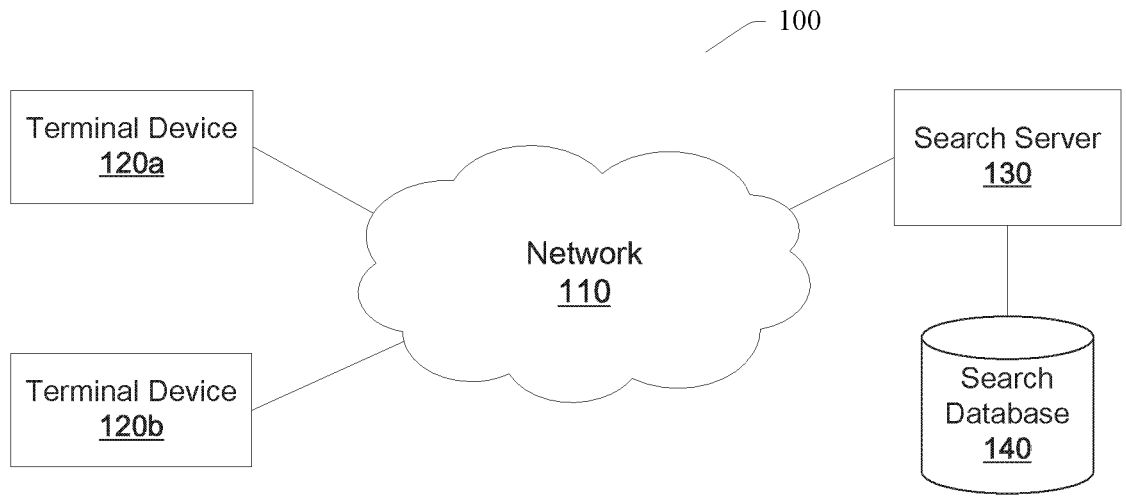
FIG. 1 illustrates an exemplary application scenario for searching network content.

FIG. 1 illustrates an exemplary application scenario 100 for searching network content.

In FIG. 1, a network 110 is applied for interconnecting between terminal devices 120*a* and 120*b* and a search server 130. The search server 130 connects with a search database 140.

The network 110 may be any type of networks capable of interconnecting network entities. The network 110 may be a single network or a combination of various networks. In terms of coverage range, the network 110 may be a Local Area Network (LAN), a Metropolitan Area Network (MAN) or a Wide Area Network (WAN). In terms of carrying medium, the network 110 may be a wireline network or a wireless network. In terms of data switching techniques, the network 110 may be a circuit switching network, a packet switching network, or a message switching network.

The terminal devices 120*a* and 120*b* may be any type of electronic computing devices capable of connecting to the network 110, assessing servers or websites on the network 110, processing data or signals, etc. For example, the terminal devices 120*a* and 120*b* may be desktop computers, laptops, tablets, smart phones, etc. Although only two terminal devices 120*a* and 120*b* are shown in FIG. 1, it should be appreciated that a different number of terminal devices may connect to the network 110.

The search server 130 may provide search services to users by a search engine. The search database 140 may store information that is used by the search server 130 to provide search results. For example, when receiving a search query from the terminal device 120*a*, the search server 130 may obtain information relevant to the search query from the search database 140, and accordingly provide contents to a user of the client device 120*a* as a search result. The search database 140 may be separated from the search server 130, or be incorporated in the search server 130.

It should be appreciated that all the network entities shown in FIG. 1 are exemplary, and depending on specific application requirements, any other network entities may be involved in the application scenario 100.

In a circumstance that a user submits a search query for an event through a terminal device to a search server, according to traditional search and recommendation techniques, the search server will consider relevance, freshness and authority, and provide a list of links to the user as a search result or content recommendation. In contrast, according to the embodiments of the present disclosure, the search server may consider various search intents of the user associated with the event when determining a content recommendation to the user. The search intents herein may be various possible search purposes or needs of the user when the user submits the search query for the event through the terminal device. The content recommendation may comprise recommended contents that are determined based on the search intents and to be recommended to the user. The recommended contents herein may be, such as, documents, social network messages, etc. Moreover, the embodiments of the present disclosure may present the content recommendation in a structured form at the terminal device. The structured form herein indicates that various information of the content recommendation may be displayed in respective regions of a page for presenting the content recommendation. The present disclosure can provide the users with desired content recommendation, and make the users have a better user engagement.

In an aspect, the search intents may comprise topics relevant to the event. The topics herein may indicate various content branches derived from contents associated with the event. These content branches may correspond to groups of contents defining various aspects of the event respectively. For example, when the user is performing a search query on "Malaysia airlines flight 370", the user may have a search intent to learn about various aspects of the event of "MH370 Crash" and relevant contents. Accordingly, the embodiments of the present disclosure may provide one or more topics of the event and relevant contents. The one or more topics may include, such as, "Global search and rescue", "Government responses", "Victims and their families", etc. However, it should be appreciated that some events may have no topic because there may be no explicit content branch derived from contents associated with these events.

In an aspect, the search intents may comprise critical moments of the event. The critical moments herein may refer to milestone time points in a progress of the event. Each of the critical moments may correspond to a turning point or an important time point during development of the event. For example, when the user is performing a search query on "Malaysia airlines flight 370", the user may have a search intent to learn about critical moments of the event of "MH370 Crash" and relevant contents. In this example, a critical moment may be "Mar. 8, 2014-12:40 am" at which the flight took off from Kuala Lumpur, a further critical moment may be "Mar. 9, 2014" on which the search area is widened to 50 nautical miles from 20 nautical miles, another critical moment may be "Mar. 11, 2014" on which the Malaysian police announced investigation areas, and so on.

In an aspect, the search intents may comprise locations associated with the event. The locations herein may refer to locations where the event occurs or locations concerned by the event. For example, when the user is performing a search query on "Malaysia airlines flight 370", the user may have a search intent to learn about where this flight disappearance event happened. In this example, the locations may include "Malaysia".

In an aspect, the search intents may comprise persons associated with the event. The persons herein may refer to persons involved in the event. For example, when the user is performing a search query on "Malaysia airlines flight 370", the user may have a search intent to learn about which persons are involved in this event and background information of these persons. In this example, the persons may include "Zaharie Shah" which is the captain of the flight.

In an aspect, the search intents may comprise dominant subjects associated with the event. The dominant subjects herein may refer to essence or core of the event. For example, when the user is performing a search query on "Malaysia airlines flight 370", the user may have a search intent to learn about what happened in this event. In this example, the dominant subjects may include "air crash" which indicates that this event is about an air crash event.

In an aspect, the search intents may comprise representative documents from mainstream media associated with the event. The documents herein may refer to reports, articles, records, etc. The mainstream media herein may refer to any journalistic entity that provides news and information to the public and reflects prevailing opinions, such as, CNN, FOX news, etc. The representative documents herein may be the latest, authoritative, or most-concerned documents associated with the event that are issued by mainstream media. For example, when the user is performing a search query on "Malaysia airlines flight 370", the user may have a search intent to read reports from mainstream media. In this example, the representative documents from mainstream media may be a latest report on this event issued by CNN, a report on this event from FOX news the click count of which is the highest, etc.

In an aspect, the search intents may comprise representative messages from social network. The social network herein may refer to any network platform by which social network providers can provide social network services to users. The users may submit and share all kinds of messages on social network, such as tweets, blogs, micro blogs, posts, etc. The representative messages from social network herein may refer to the latest, authoritative, or most-concerned messages associated with the event on social network. For example, when the user is performing a search query on "Malaysia airlines flight 370", the user may have a search intent to read messages from social network. In this example, the representative messages from social network may be, such as, a tweet on Twitter or a microblog comment on Sina Microblog that has a largest retweet count.

In an aspect, the search intents may comprise multimedia information on the event. The multimedia information herein may refer to images, videos, audios, etc. that are shot or recorded during the event or capable of representing the event. For example, when the user is performing a search query on "Malaysia airlines flight 370", the user may have a search intent to see images or videos associated with this event. In this example, the multimedia information on the event may comprise an image gallery or a video gallery that are shot during the event of "MH370 Crash".

Although some examples of the search intents have been described above, it should be appreciated that the search intents may comprise any other search intents that can reflect any other possible search purposes or needs of the user.

As mentioned above, the embodiments of the present disclosure may determine recommended contents based on the search intents of the user. In some implementations, the present disclosure may utilize a predetermined event set to determine recommended contents based on the search intents. The event set herein may be a set which is formed by various events, such as, the event of "MH370 Crash", the event of "US presidential election of 2016", etc. The event set may comprise information on a plurality of events that are happening or happened in the world. The information on the plurality of events may comprise, such as, a plurality of search queries associated with the plurality of events, features of the plurality of events, etc. The event set may be stored in, such as, the search database 140 shown in FIG. 1. Thus the search server 130 may utilize information in the event set stored in the search database 140 to provide content recommendation.

In an aspect, the event set may comprise a plurality of search queries associated with the plurality of events. For example, as for the event of "MH370 Crash", the event set may comprise search queries of "Malaysia airlines flight 370", "MH370 latest news", "MH370 rescue", etc. associated with the event. These exemplary search queries may be mapped to the event of "MH370 Crash". The mapping between search queries and events in the event set may be used for finding an event corresponding to a search query from a user. For example, when the user is performing a search query on "Malaysia airlines flight 370", a fully matched search query of "Malaysia airlines flight 370" or a partially matched search query of "MH370 latest news" may be found in the event set and accordingly this search query from the user may be mapped to the event of "MH370 Crash".

In an aspect, the event set may comprise features of the plurality of events. Each of the events in the event set has features corresponding to search intents associated with the event respectively. That is, features of an event in the event set may comprise at least one of: topic relevant to the event; critical moment of the event; location associated with the event; person involved in the event; dominant subject relevant to the event; representative document from mainstream media; representative message from social network; and multimedia information on the event.

Each feature of an event may have one or more associated recommended contents. These recommended contents may be classified into one or more groups of recommended contents. Each group of recommended contents may be used for deriving or obtaining a corresponding sub-content. The sub-content herein may refer to information that is to be presented to the user in the content recommendation. Each sub-content may be correlated to a group of recommended contents associated with this sub-content. Each sub-content may at least comprise a key word and one or more pieces of extracted information. The key word herein is an indication of common nature, corresponding to the feature, among the group of recommended contents associated with the sub-content, and may be derived from the group of recommended contents associated with the sub-content. The extracted information herein is an extracted part of each recommended content in the group of recommended contents associated with the sub-content.

Taking the "topic" feature relevant to the event of "MH370 Crash" as an example, there may be 20 recommended contents associated with this event. For example, through a semantic vector clustering, 8 recommended contents in the 20 recommended contents may be semantically related with each other and may correspond to a first sub-content, and other 12 recommended contents in the 20 recommended contents may be semantically related with each other and may correspond to a second sub-content. The first sub-content may comprise a key word of "Global search and rescue" which is a common topic involved in the 8 recommended contents corresponding to the first sub-content. Moreover, the first sub-content may comprise 8 pieces of extracted information that is obtained from the 8 recommended contents corresponding to the first sub-content respectively. The extracted information in the first sub-content may be, such as, the title of the first content in the 8 recommended contents, the first paragraph of the second content in the 8 recommended contents, a snippet of the third content in the 8 recommended contents, both the title and the first paragraph of the fourth content in the 8 recommended contents, and so on. Similarly, the second sub-content may comprise a key word of "Government responses" and 12 pieces of extracted information obtained from the 12 recommended contents corresponding to the second sub-content When mapping a search query from a user to an event in the event set, a content recommendation may be made based on the features of the event. For example, sub-contents of each feature of the event may be presented to the user in the content recommendation. As mentioned above, the features of the event may correspond to search intents associated with the event, and accordingly the sub-contents presented to the user may also correspond to these search intents. In some implementations, the sub-contents of each feature of the event presented to the user may contain hyperlinks to recommended contents, and thus when the user clicks on the sub-contents, a further presentation, such as, complete recommended contents, may be shown to the user. Since the content recommendation is tailored to the search intents, the user may have a better user engagement.

Figure 2:
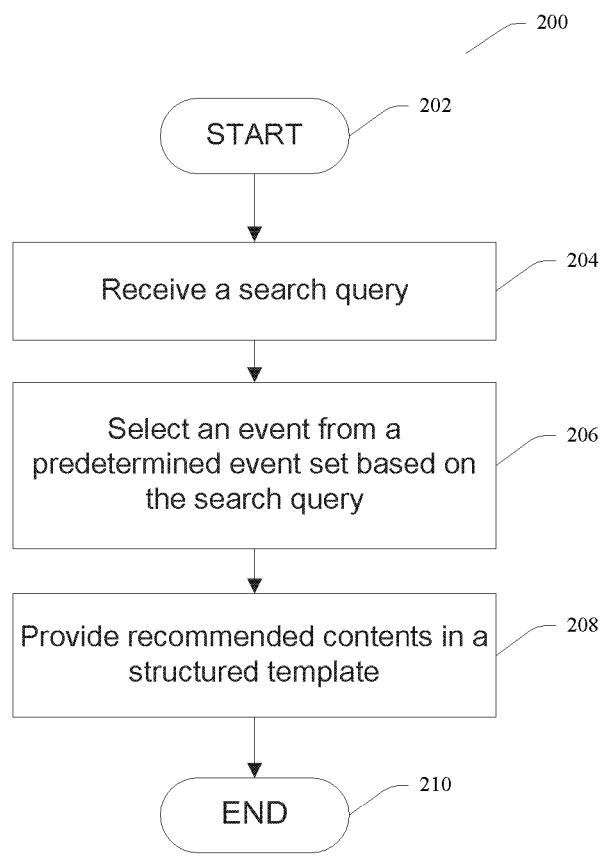
FIG. 2 is a flowchart of an exemplary method for providing recommended contents according to an embodiment of the present disclosure.

FIG. 2 is a flowchart of an exemplary method 200 for providing recommended contents according to an embodiment of the present disclosure. In some implementations, the present disclosure may use a received search query to select a corresponding event form a predetermined event set, and further provide recommended contents associated with the event in a structured template.

The method 200 starts at 202, and proceeds to 204. At 204, a search query may be received.

At 206, an event may be selected from a predetermined event set based on the search query.

In an implementation, the event may be selected from a plurality of events in an event set based on the search query. The event set may comprise a plurality of search queries associated with a plurality of events. If the search query received from the terminal device of the user matches with a search query in the plurality of search queries in the event set, an event corresponding to the search query in the event set may be selected.

At 208, recommended contents may be provided in a structured template.

Template herein is a layout model of a user interface (UI) for presenting information to a user. The structured template herein may refer to a template adopting a structured form. For example, in the structured template, the UI, such as a web page, may be divided into one or more regions, and each region is an element of the structured template. The structured template may present information in one or more elements respectively.

In the event set, each feature of the event may have one or more associated recommended contents. These recommended contents may be provided to the user through the structured template. Each element of the structured template may be associated with a feature of the event. Each element of the structured template may include one or more sub-contents. Each sub-content may be correlated to corresponding recommended contents. In other words, each element of the structured template may be used for presenting one or more sub-contents of a feature of the event. Each feature of the event may correspond to a search intent associated with the event, and accordingly each element of the structured template may also correspond to a search intent associated with the event. The user may obtain a content recommendation through presenting sub-contents on a display component of a terminal device based on the structured template.

In an implementation, the structured template may be presented based on a scale of the recommended contents. The scale herein may refer to the number or information volume of the recommended contents. The scale may be used for determining presentation approach of the elements in the structured template. For example, if a size of an element is not enough to accommodate all sub-contents of a feature of the event associated with this element, the size of the element may be enlarged, or otherwise, a scroll bar or a page up/down button may be set in the element. While if a size of an element is sufficient for accommodating all sub-contents of a feature of the event associated with this element, and there is a vacant area in the element, the size of the element may be reduced such that other elements may obtain more areas to accommodate their associated sub-contents.

In an implementation, the structured template may be presented with a color corresponding to a social sentiment on the event. The social sentiment on the event herein may refer to an emotion status of the public on the event. The social sentiment on the event may be determined through performing social sentiment analysis on recommended contents associated with the event. The embodiments of the present disclosure may adopt any types of social sentiment analysis techniques for determining the social sentiment on the event. For example, social sentiment analysis techniques that are based on linguistic parsing may be adopted. The social sentiment on the event may be denoted in various manners, such as, denoted as positive, negative or neutral, denoted as pleasant, angry, sad, excited, or disappointed, etc. The social sentiment on the event may be used for determining one or more colors of the elements of the structured template. The colors may be adaptive to the social sentiment on the event. For example, if the social sentiment is pleasant, then a warm color or a combination of warm colors may be used for one or more elements of the structured template. While if the social sentiment is sad, then a dim color or a combination of dim colors may be used for one or more elements of the structured template.

Figure 3:
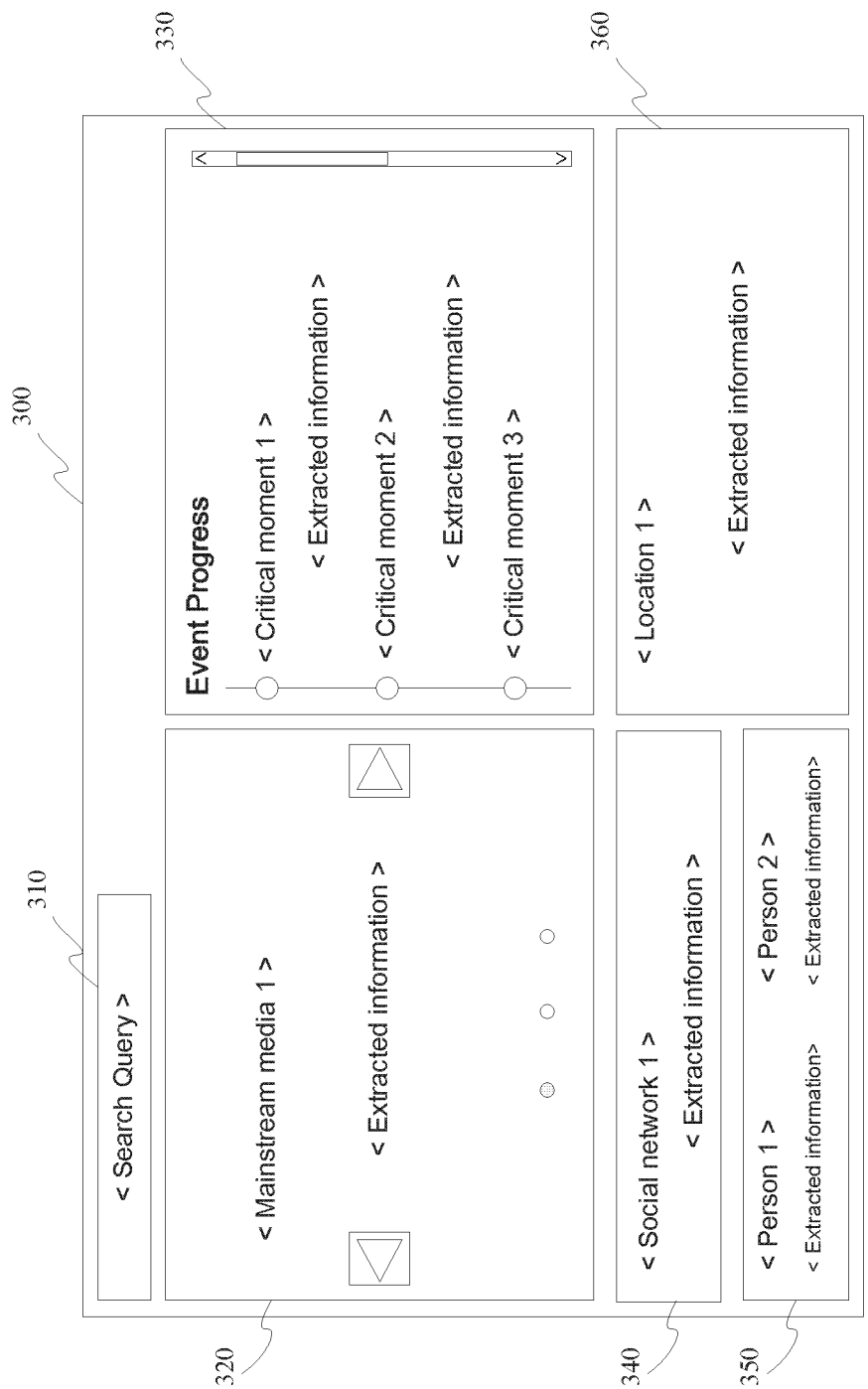
FIG. 3 illustrates an exemplary structured template according to an embodiment of the present disclosure.

FIG. 3 illustrates an exemplary structured template 300 according to an embodiment of the present disclosure.

As shown in FIG. 3, features of an event are shown in different elements of the structured template 300. A search query from a user is shown in element 310. Sub-contents of a representative document feature are shown in element 320. Page up and page down buttons are set in the element 320 for navigating among the sub-contents. Sub-contents of a critical moment feature are shown in element 330, which include a plurality of critical moments and corresponding extracted information. A scroll bar is set in the element 330 for navigating in the event progress. A sub-content of a representative message feature is shown in element 340. Sub-contents of a person feature are shown in element 350. A sub-content of a location feature is shown in element 360.

Figure 4:
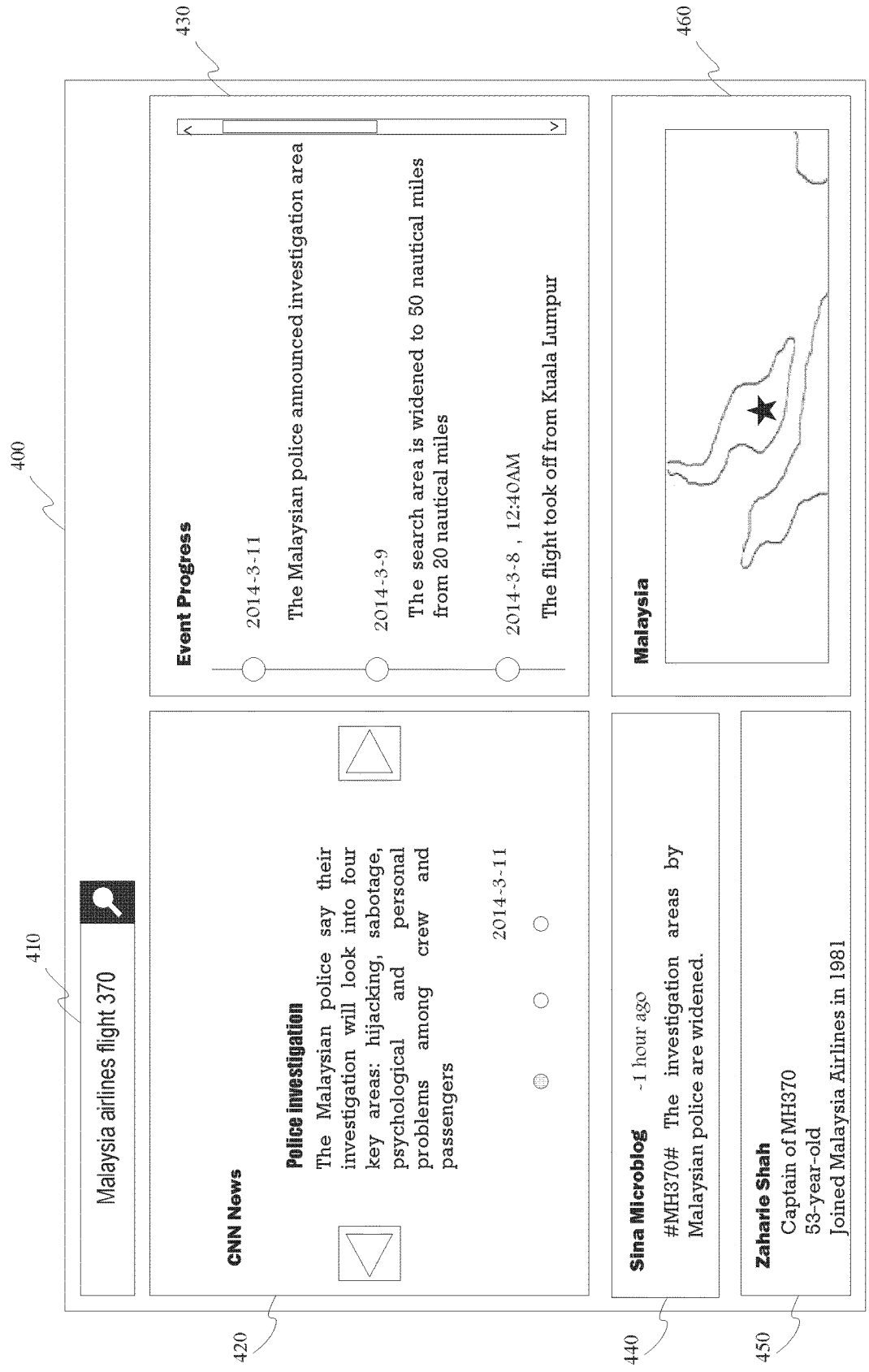
FIG. 4 illustrates an exemplary web page according to an embodiment of the present disclosure.

FIG. 4 illustrates an exemplary web page 400 according to an embodiment of the present disclosure. The web page 400 may be presented for a user at a terminal device at least based on the structured template 300.

A search query of "Malaysia airlines flight 370" may be submitted by the user. A search result may be returned to the user in the web page 400. The search query is shown in element 410. The feature of representative document from mainstream media is included in element 420. For example, a news from CNN is currently shown in the element 420. The feature of critical moment is included in element 430. For example, the event progress is shown the element 430, which comprises sub-contents of the critical moment feature. The feature of representative message from social network is included in element 440. For example, a microblog from Sina Microblog is currently shown in the element 440. The feature of person involved in the event is included in element 450. For example, information about the captain is shown in the element 450. Moreover, the feature of location is included in element 460. For example, a map marked with Malaysia is shown in the element 460.

Figure 5:
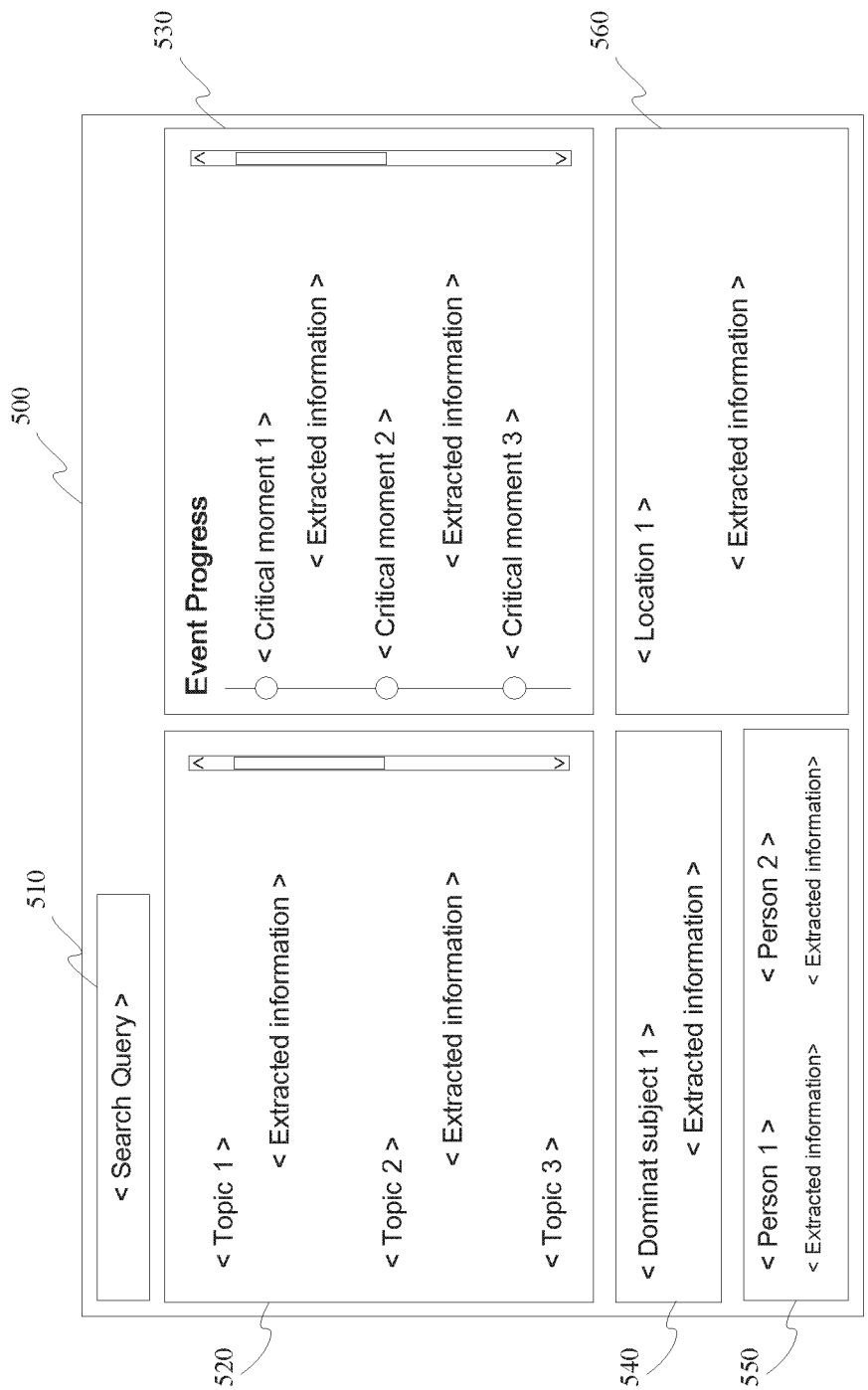
FIG. 5 illustrates another exemplary structured template according to an embodiment of the present disclosure.

FIG. 5 illustrates another exemplary structured template 500 according to an embodiment of the present disclosure.

A search query from a user is shown in element 510. Sub-contents of a topic feature are shown in element 520. Sub-contents of a critical moment feature are shown in element 530. A sub-content of a dominant subject feature is shown in element 540. Sub-contents of a person feature are shown in element 550. A sub-content of a location feature is shown in element 560.

Figure 6:
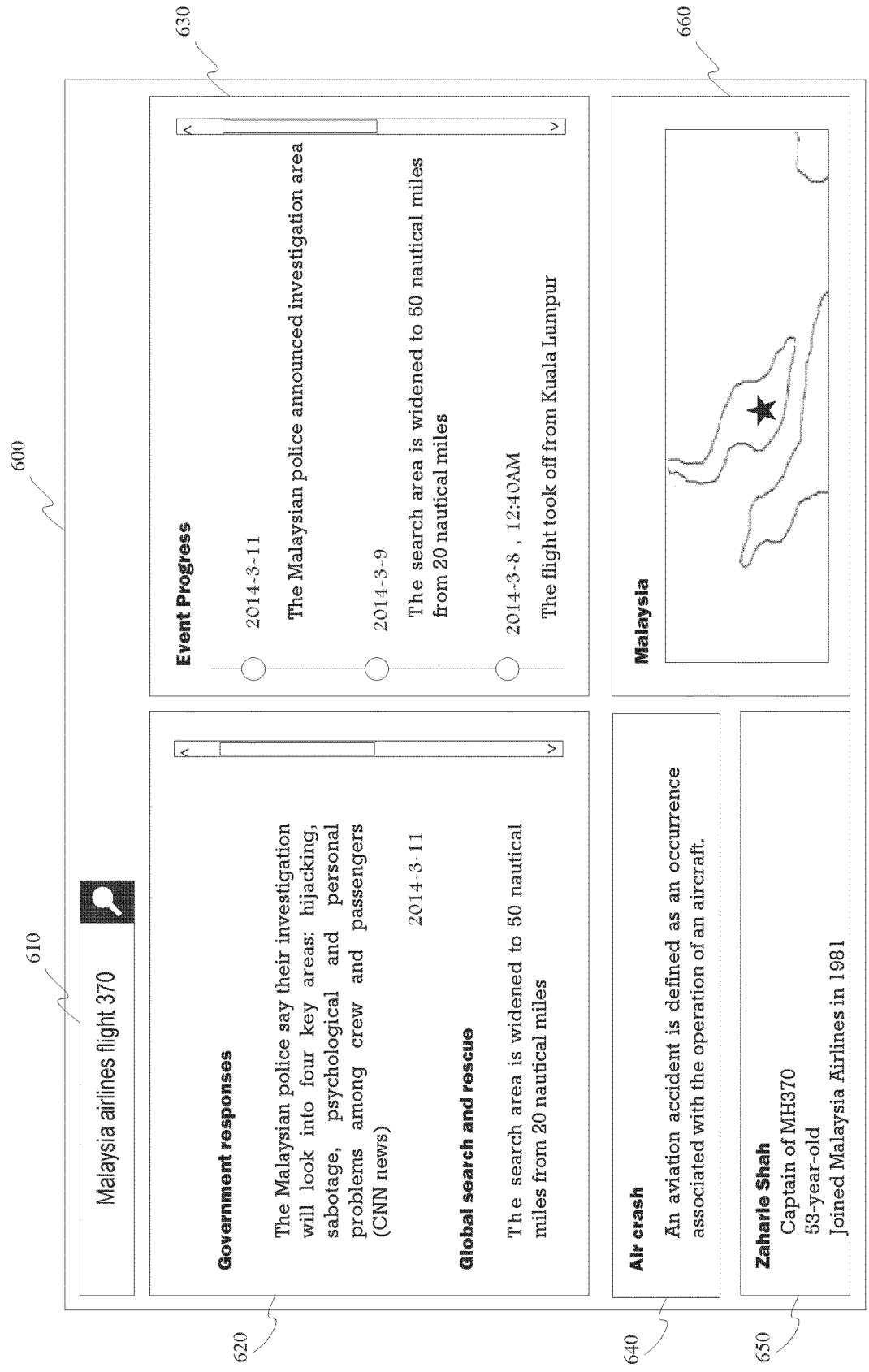
FIG. 6 illustrates another exemplary web page according to an embodiment of the present disclosure.

FIG. 6 illustrates another exemplary web page 600 according to an embodiment of the present disclosure. The web page 600 may be presented for a user at a terminal device at least based on the structured template 500.

A search query of "Malaysia airlines flight 370" may be submitted by the user. A search result may be returned to the user in the web page 600. The search query is shown in element 610. The feature of topic relevant to the event is included in the element 620. For example, two topics, i.e., "Government response" and "Global search and rescue", and their related news are currently shown in the element 620. The feature of critical moment is included in element 630. For example, the event progress is shown the element 630, which comprises sub-contents of the critical moment feature. The feature of dominant subject relevant to the event is included in the element 640. For example, the dominant subject of "Air crash" and its introduction are shown in the element 640. The feature of person involved in the event is included in element 650. For example, information about the captain is shown in the element 650. Moreover, the feature of location is included in element 660. For example, a map marked with Malaysia is shown in the element 660.

It should be appreciated that the structured templates in FIG. 3 and FIG. 5 and the web pages in FIG. 4 and FIG. 6 are only exemplary. According to actual application requirements, structured templates with any other arrangements and any other elements may be adopted for presenting recommended contents. Moreover, although not shown in FIG. 3 to FIG. 6, colors of elements in the templates may also be set according to a social sentiment on the event.

Figure 7:
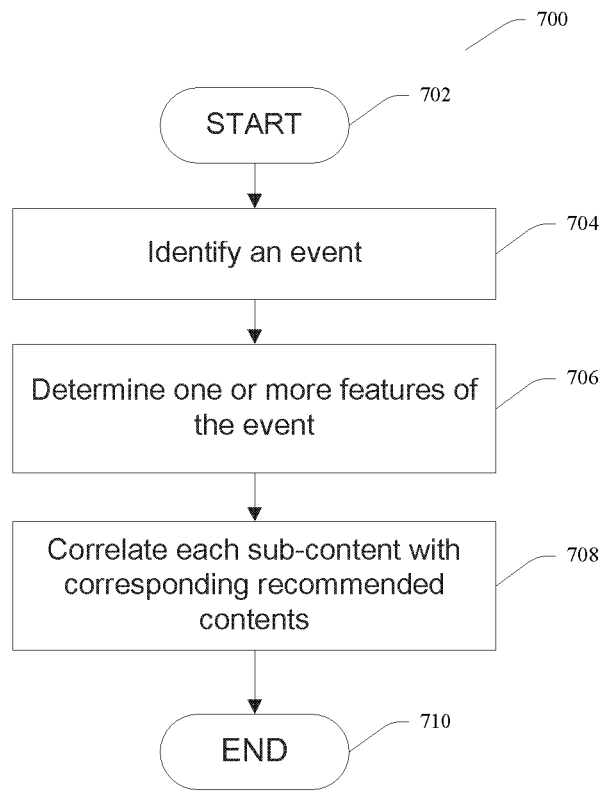
FIG. 7 is a flowchart of an exemplary method for providing recommended contents according to an embodiment of the present disclosure.

FIG. 7 is a flowchart of an exemplary method 700 for providing recommended contents according to an embodiment of the present disclosure. In some aspects, the method 700 may be used for establishing an event set. This event set may be further used for providing recommended contents to a user who is performing a search query. Although the method 700 is described below with respect to an event in the event set, it should be appreciated that this method may also be applied for any other events in the event set in the same way.

The method 700 starts at 702 and proceeds to 704. At 704, an event may be identified based on a plurality of search queries which are spiking within a period.

Usually, if an event happens or develops, network users may attempt to search relevant information on the event through a search engine, and thus the frequency of search queries associated with this event may increase tremendously within a period, i.e., the search queries are spiking within a period. The period herein may be defined manually and empirically, or be defined by reference to, such as, updating time intervals of news web sites. The embodiments of the present disclosure may use the search queries which are spiking within a period to determine whether a corresponding event happens. For example, if search queries of "Malaysia airlines flight 370", "Malaysia flight crash", "MH370 latest news", "MH370 rescue", etc. are spiking within a period, such as, 10 hours, these search queries may be used for identifying an event of "MH370 Crash". The process of identifying an event at 704 will be discussed in more details later in connection with FIG. 8.

At 706, one or more features of the event may be determined.

As mentioned above, each feature of the event may correspond to a search intent. Recommended contents may be provided in a structured template including one or more elements. Each element of the structured template may be associated with a feature of the event, and each element may include one or more sub-contents of the feature of the event.

Determining a feature of the event may refer to determining one or more sub-contents of the feature. Further, determining a sub-content of the feature may comprise determining a key word and one or more pieces of extracted information in the sub-content. A key word of a sub-content may be derived from recommended contents associated with the sub-content. The one or more pieces of extracted information in the sub-content may be obtained from the recommended contents associated with the sub-content respectively.

In some implementations, considering that with development of the event, new search queries or new contents may continually occur on the network, the features of the event may also be updated dynamically. For example, the new contents may be taken into account during updating the features of the event.

The determining of features of the event at 706 will be discussed in more details later.

At 708, each of the sub-contents may be correlated with corresponding recommended contents.

The correlating at 708 may refer to establish a mapping relationship between each sub-content and recommended contents associated with the sub-content. Key word of a sub-content may be mapped to all recommended contents associated with the sub-content, and extracted information in a sub-content may be mapped to a respective recommended content. For example, each piece of extracted information in the sub-content may contain a hyperlink to a respective recommended content, and thus when the user clicks on a piece of extracted information, a complete content associated with the piece of extracted information may be showed to the user.

Figure 8:
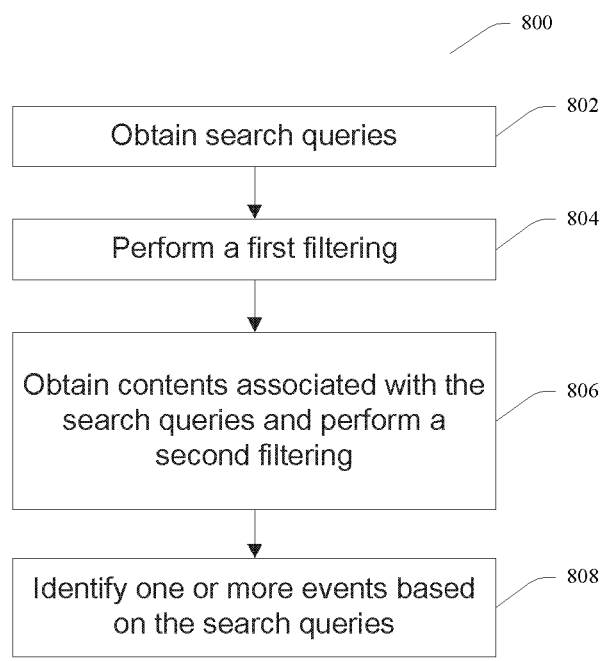
FIG. 8 is a flowchart of an exemplary process for identifying events according to an embodiment of the present disclosure.

FIG. 8 is a flowchart of an exemplary process 800 for identifying events according to an embodiment of the present disclosure. In some implementations, the present disclosure may use spiking search queries on the network to identify events. The identified events may be further used for, such as, establishing the event set.

At 802, search queries which are spiking within a period may be obtained.

Various approaches may be adopted for obtaining the search queries. For example, search engine providers usually maintain statistic data of search queries, and the statistic data may be used for determining those search queries that are spiking within a period.

In another implementation, the obtaining of search queries at 802 may be based on spiking documents. The spiking documents herein may refer to various documents on the network that increase tremendously within a period. For example, after it is confirmed that the flight MH370 has disappeared, a large number of documents, such as, news, related to MH370 may emerge on the network within 5 hours, and these spiking documents may indicate that a relevant event is very likely happening. The obtaining at 802 may comprise detecting spiking documents and synthesizing the spiking documents into search queries. For example, a Title-to-Query translation technique may be used for obtaining search queries based on titles of the spiking documents.

At 804, a first filtering may be performed on the search queries to filter out search queries caused by periodic fluctuations.

The periodic fluctuations may indicate changes of network traffic occurred periodically and not triggered by happening of events. For example, users tend to query "Today's weather" between 6 am to 8 am every day, and accordingly a large number of relevant search queries may occur in this period every day. However, these search queries are not likely relevant to events, and thus may be excluded from the search queries that are concerned by the present disclosure.

An approach based on detrend analysis may be used for filtering out search queries caused by periodic fluctuations from the search queries obtained at 802. For each search query, counts of contents matching the search query within a plurality of periods may be obtained. For example, counts of contents matching the query in the past hour, the past day and the past two weeks may be obtained. Then, all the search queries may be ranked based on the obtained counts. For example, in the case of obtaining counts of matched contents in the past hour, the past day and the past two weeks for the search queries, these search queries may be ranked by:

$$\frac{(\text{Count\_in the past hour} + 1)^2 \times (\text{Count\_in the past day} + 1)}{\text{Count\_in the past two weeks} + 1000} \quad \text{Equation (1)}$$

Then, the top ranked one or more search queries may be remained, while the lower ranked queries may be removed. It should be appreciated that the above Equation (1) and parameters therein are all exemplary, and depending on specific application requirements, any other forms of ranking equations and any other periodical counts may be adopted in this approach.

At 806, contents associated with the search queries having been performed by the first filtering may be obtained. Various approaches may be adopted by the present disclosure to obtain contents associated with the search queries having been performed by the first filtering. For example, the contents may be crawled from the network by network crawlers.

Moreover, at 806, a second filtering may be performed on the search queries having been performed by the first filtering, to filter out time-sensitive search queries. The second filtering may be at least based on the contents associated with the search queries having been performed by the first filtering.

In some circumstances, the search queries may include some time-sensitive search queries that are not relevant to events. The time-sensitive search queries herein may refer to search queries usually occurring at or near a specific time point. For example, when approaching Christmas, December 25, a large number of search queries about "Christmas tree" may occur on the network. These search queries are time-sensitive, i.e., occurring near December 25, but may not direct to an event. Thus, it may be beneficial to filter out time-sensitive search queries from the search queries having been performed by the first filtering.

Various approaches may be adopted by the present disclosure to perform the second filtering. In some implementations, the second filtering may be based on statistic data of contents as well as search queries. For example, for a certain search query, a feature vector X may be defined by counts of the search query in the past hour, the past day and the past week. A feature vector Y may be defined by counts of matched documents, or matched titles of documents, in the past hour, the past day and the past week. A feature vector Z may be defined by counts of matched hashtags of tweets in the past hour, the past day and the past week. Then an activation function $F(X, Y, Z)=1$ or $0$ may be defined, where $F=1$ indicates that the search query may trigger an event, i.e., relevant to an event, and $F=0$ indicates that the search query may not trigger an event, i.e., relevant to non-event. The activation function F may be empirically decided or obtained through machine learning. A relevant cost function may be, such as, inverse of total count of clicks on search results within a time window. It should be appreciated that any other feature vectors may be provided to the activation function F, such as, counts of retweets in different periods, counts of clicks on matched documents in different periods, etc.

At 808, one or more events may be identified based on the search queries having been performed by the second filtering.

Various approaches may be adopted by the present disclosure to determine the one or more events based on the search queries having been performed by the second filtering.

In one implementation, a search query may be used for identifying an event. That is, one event has one corresponding search query.

In another implementation, two or more search queries may be used for identifying an event. That is, one event has two or more corresponding search queries. In this case, it may need to classify search queries into various groups, each group containing two or more search queries and corresponding to an event. In some circumstances, contents, such as, documents and/or social network messages, associated with the search queries may be used for performing the classifying. For example, semantic vectors may be generated for contents associated with each of the search queries respectively, and then a semantic analysis may be performed on the semantic vectors. The semantic analysis may divide the semantic vectors into one or more sets of semantic vectors, each set including semantic vectors that are relevant to each other. Contents corresponding to semantic vectors in the same set of semantic vectors as well as search queries associated with these contents may be classified into a group and used for identifying one event.

It should be appreciated that the first filtering at 804 and the second filtering at 806 are optional, and depending on specific application requirements, either or both of them may be omitted from the process 800. For example, if the first filtering at 804 is omitted, then at 806, contents associated with the search queries obtained at 802 may be obtained, and the second filtering may be performed on the search queries obtained at 802. If the second filtering at 806 is omitted, then at 808, one or more events may be identified based on the search queries having been performed by the first filtering at 804. If both the first filtering at 804 and the second filtering at 806 are omitted, then at 808, one or more events may be identified based on the search queries obtained at 802.

Next, the determining of features of an event in an event set will be discussed. As mentioned above, determining a feature of an event may comprise determining one or more sub-contents of the feature, and determining a sub-content of the feature may comprise determining a key word and one or more pieces of extracted information in the sub-content.

The features of the event may be topic relevant to the event. The topic feature may comprise one or more sub-contents associated with the topic feature. Each sub-content associated with the topic feature may comprise a key word and one or more pieces of extracted information.

Figure 9:
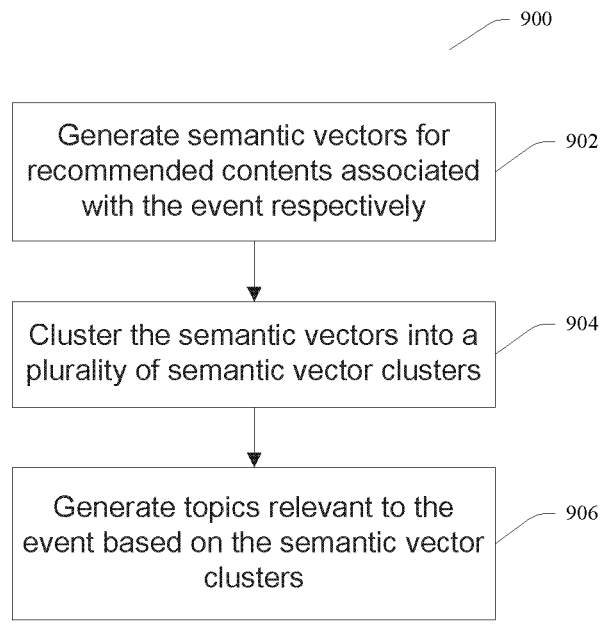
FIG. 9 is a flowchart of an exemplary process for determining topics according to an embodiment of the present disclosure.

Key words of one or more sub-content associated with the topic feature may be one or more topics relevant to the event. Various approaches may be adopted by the present disclosure for generating topics relevant to the event. FIG. 9 is a flowchart of an exemplary process 900 for generating topics according to an embodiment of the present disclosure. The process 900 may generate topics based on a semantic vector clustering approach.

At 902, semantic vectors may be generated for recommended contents associated with the event respectively. The semantic vector herein may refer to a vector representation of semantic meaning of content. Various approaches for generating semantic vectors may be adopted. For example, in an implementation, a Convolutional Deep Structured Semantic Model (CDSSM) deep learning technique may be used for generating semantic vectors of recommended contents associated with the event.

At 904, the semantic vectors may be clustered into a plurality of semantic vector clusters. For example, an Affinity Propogation Clustering technique may be used for clustering the semantic vectors. Alternatively, the semantic vectors may also be clustered by any other techniques, such as, K-Means clustering, K-Nearest Neighbor (KNN) clustering, etc. Since each recommended content may correspond to a semantic vector, through clustering the semantic vectors as mentioned above, recommended contents associated with the event are also clustered accordingly.

At 906, topics relevant to the event may be generated based on the plurality of semantic vector clusters. Some of the semantic vector clusters may be semantically related to each other, and meanwhile not semantically related to other semantic vector clusters. In some implementations, those semantic vector clusters being semantically related to each other may be used for generating a corresponding topic. In this way, one or more topics may be generated for the event.

Through the process 900 in FIG. 9, one or more topics relevant to the event may be generated, and the one or more topics may be used as key words of one or more sub-contents associated with the topic feature respectively. Moreover, through the process 900, those recommended contents that are used for generating a key word of a sub-content may also be correlated with the sub-content.

Extracted information of a sub-content associated with the topic feature may be obtained from those recommended contents that are used for generating the topic included in the sub-content as a key word respectively. Extracted information may be, such as, title of a corresponding recommended content, snippet of the corresponding recommended content, hashtag of the corresponding recommended content, abstract of the corresponding recommended content, the whole corresponding recommended content, etc. Moreover, in some implementations, the recommended contents associated with the sub-content may be ranked by predefined criteria, such as, click count, issue date, etc. Accordingly, the extracted information may be presented to a user at a corresponding ranking order.

The features of the event may be critical moment of the event. The critical moment feature may comprise one or more sub-contents associated with the critical moment feature. Each sub-content associated with the critical moment feature may comprise a key word and one or more pieces of extracted information.

A key word of a sub-content associated with the critical moment feature may be a critical moment in a progress of the event. Various approaches may be adopted by the present disclosure for determining critical moments of the event. In an implementation, a local regression for smoothing and trend detection may be performed based on statistical data of recommended contents associated with the event. The statistical data may be any types of volume information of the recommended contents, such as, click counts, the number of documents, etc. Through the local regression, a progress curve model can be obtained for the event. Moreover, the local regression may also ensure that the model is continuous. Then, a local optimum detection may be performed based on the result of the local regression. Local optimum points may be obtained by the local optimum detection, wherein the local optimum points may be, such as, points having no first derivatives in the progress curve model. The local optimum points may be identified as the critical moments of the event. The critical moments may be used as key words of one or more sub-contents associated with the critical moment feature respectively.

Extracted information of a sub-content associated with the critical moment feature may be obtained from those recommended contents that are used for generating the critical moment included in the sub-content as a key word respectively. Extracted information may be, such as, title, snippet, hashtag, abstract, or the whole set of a corresponding recommended content. Moreover, in some implementations, the recommended contents associated with the sub-content may be ranked by predefined criteria, such as, closeness of time, click count, etc. Accordingly, the extracted information may be presented to a user at a corresponding ranking order.

The one or more sub-contents associated with the critical moment feature may be presented in a timeline form, wherein each node in the timeline may indicate a critical moment included in a sub-content, and the critical moment may be presented together with extracted information in the sub-content.

The features of the event may be any one of location associated with the event, person involved in the event, and dominant subject relevant to the event. The location feature may comprise one or more sub-contents associated with the location feature, and a key word of each sub-content associated with the location feature may be a location associated with the event. The person feature may comprise one or more sub-contents associated with the person feature, and a key word of each sub-content associated with the person feature may be a person associated with the event. The dominant subject feature may comprise one or more sub-contents associated with the dominant subject feature, and a key word of each sub-content associated with the dominant subject feature may be a dominant subject associated with the event.

The locations, persons and dominant subjects associated with the event may be detected from the recommended contents associated with the event. Various approaches may be adopted by the present disclosure for detecting the locations, persons and dominant subjects. In an implementation, a Named Entity Recognition (NER) algorithm may be adopted for recognizing locations, persons and dominant subjects from the recommended contents. Alternatively, a cross-content voting mechanism may be further applied. For example, if "City A" has a voting score of 100, i.e., recognizing "City A" from 100 documents/tweets, while "City B" has a voting score of 5, i.e., only recognizing "City B" from 5 documents/tweets, then "City A", instead of "City B", may be determined as a location associated with the event. The locations, persons and dominant subjects determined above may be used as key words of one or more sub-contents associated with the location feature, the person feature and the dominant subject feature respectively.

Extracted information of a sub-content associated with the location feature may be obtained from those recommended contents that are used for generating the location included in the sub-content as a key word. The extracted information may also be obtained from any content sources on the network. The extracted information may be, such as, a map marked with the location, GPS coordinates of the location, description of the location, etc. included in a corresponding recommended content.

Extracted information of a sub-content associated with the person feature may be obtained from those recommended contents that are used for generating the person included in the sub-content as a key word. The extracted information may also be obtained from any content sources on the network. The extracted information may be, such as, profession of the person, experience of the person, education background of the person, photo of the person, etc. included in a corresponding recommended content.

Extracted information of a sub-content associated with the dominant subject feature may be obtained from those recommended contents that are used for generating the dominant subject included in the sub-content as a key word. The extracted information may also be obtained from any content sources on the network. The extracted information may be, such as, background of the dominant subject, historical records of the dominant subject, reasons of the dominant subject, etc.

The features of the event may be representative document from mainstream media about the event. The representative document feature may comprise one or more sub-contents associated with the representative document feature. Each sub-content associated with the representative document feature may comprise a key word and one or more pieces of extracted information.

A key word of a sub-content associated with the representative document feature may be the name of mainstream media, such as, CNN, FOX news, etc.

Extracted information of a sub-content associated with the representative document feature may be obtained from those recommended contents, e.g., documents, that are used for generating the name of mainstream media included in the sub-content as a key word respectively. Extracted information may be, such as, title, snippet, abstract, or the whole set of a corresponding recommended content. Moreover, in some implementations, the recommended contents associated with the sub-content may be ranked by predefined criteria, such as, issue time, click count, etc. Accordingly, the extracted information may be presented to a user at a corresponding ranking order.

The features of the event may be representative message from social network about the event. The representative message feature may comprise one or more sub-contents associated with the representative message feature. Each sub-content associated with the representative message feature may comprise a key word and one or more pieces of extracted information.

A key word of a sub-content associated with the representative message feature may be the name of social network, such as, Twitter, Sina Microblog, etc.

Extracted information of a sub-content associated with the representative message feature may be obtained from those recommended contents, e.g., social network messages, that are used for generating the name of social network included in the sub-content as a key word respectively. Extracted information may be, such as, snippet, abstract, or the whole set of a corresponding recommended content. Moreover, in some implementations, the recommended contents associated with the sub-content may be ranked by predefined criteria, such as, retweet count, click count, post time, etc. Accordingly, the extracted information may be presented to a user at a corresponding ranking order.

The features of the event may be multimedia information on the event. The multimedia information feature may comprise one or more sub-contents associated with the multimedia information feature. Each sub-content associated with the multimedia information feature may comprise a key word and one or more pieces of extracted information.

A key word of a sub-content associated with the multimedia information feature may be the type of multimedia, such as, image, video, audio, etc.

Extracted information of a sub-content associated with the multimedia information feature may be obtained from those recommended contents that are used for generating the type of multimedia included in the sub-content as a key word respectively. Extracted information may be images, videos, audios, etc. that are corresponding to the type of multimedia. Moreover, in some implementations, the recommended contents associated with the sub-content may be ranked by predefined criteria, such as, click count, issue time, etc. Accordingly, the extracted information may be presented to a user at a corresponding ranking order.

The above discussion about determining features of an event is exemplary, and the present disclosure is not limited to any details in the discussion. Any or all information obtained during determining features as mentioned above may be included in the event set. Features of events may be arranged in the event set in any forms, and the event set may also be maintained or stored in any forms. Moreover, with development of the events, further information may be continuously obtained for the events, and thus the event set may also be updated dynamically.

Figure 10:
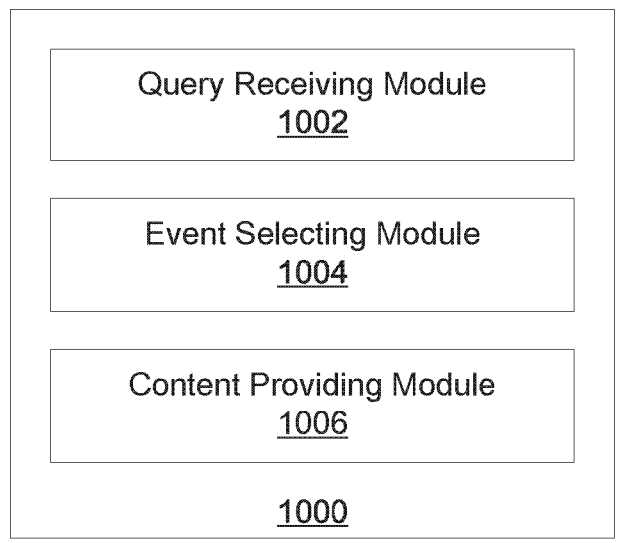
FIG. 10 illustrates an exemplary apparatus for providing recommended contents according to an embodiment of the present disclosure.

FIG. 10 illustrates an exemplary apparatus 1000 for providing recommended contents according to an embodiment of the present disclosure. In an implementation, the apparatus 1000 may be configured for performing operations of methods according to the embodiments of the present disclosure.

The apparatus 1000 may comprise a query receiving module 1002, an event selecting module 1004 and a content providing module 1006. The query receiving module 1002 may be configured for receiving a search query. The event selecting module 1004 may be configured for selecting an event from a predetermined event set based on the search query. The content providing module 1006 may be configured for providing the recommended contents in a structured template including one or more elements, each element being associated with a feature of the event, each feature of the event corresponding to a search intent, each element including one or more sub-contents, and each sub-content being correlated to corresponding recommended contents. Moreover, the apparatus 1000 may also comprise any other modules configured for performing any operations of the methods for providing recommended contents according to the embodiments of the present disclosure as mentioned above.

Figure 11:
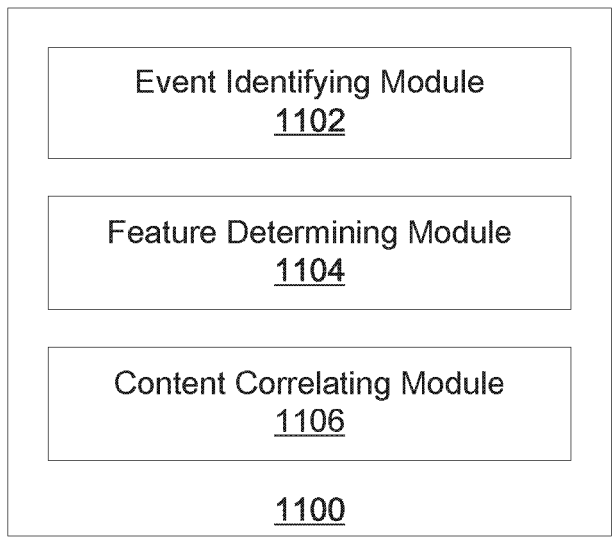
FIG. 11 illustrates an exemplary apparatus for providing recommended contents according to an embodiment of the present disclosure.

FIG. 11 illustrates an exemplary apparatus 1100 for providing recommended contents according to an embodiment of the present disclosure. In an implementation, the apparatus 1100 may be configured for performing operations of methods according to the embodiments of the present disclosure.

The apparatus 1100 may comprise an event identifying module 1102, a feature determining module 1104 and a content correlating module 1106. The event identifying module 1102 may be configured for identifying an event based on a plurality of search queries which are spiking within a period. The feature determining module 1104 may be configured for determining one or more features of the event, each feature of the event corresponding to a search intent, the recommended contents being provided in a structured template including one or more elements, each element being associated with a feature of the event, and each element including one or more sub-contents. The content correlating module 1106 may be configured for correlating each of the sub-contents with corresponding recommended contents. Moreover, the apparatus 1100 may also comprise any other modules configured for performing any operations of the methods for providing recommended contents according to the embodiments of the present disclosure as mentioned above.

Figure 12:
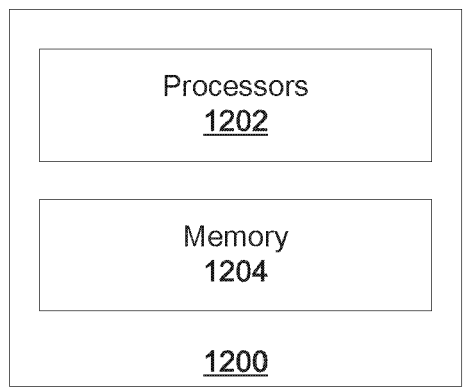
FIG. 12 illustrates an exemplary system for providing recommended contents according to an embodiment of the present disclosure.

FIG. 12 illustrates an exemplary system 1200 for providing recommended contents according to an embodiment of the present disclosure.

The system 1200 may comprise one or more processors 1202. The system 1200 may further comprise a memory 1204 that is connected with the one or more processors 1202. The memory 1204 may store computer-executable instructions that, when executed, cause the one or more processors 1202 to perform any operations of the methods for providing structured content presentation according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for providing recommended contents according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for providing recommended contents, comprising:
    identifying an event based on previous search query activity;
    storing the event in a predetermined event set;
    receiving a search query;
    calculating counts for retrieved contents related to the search query collected over a period of time;
    ranking the retrieved contents based on the counts;
    applying a first filter to the retrieved contents to remove contents t have a ranking outside a threshold;
    applying a second filter to the retrieved contents to remove contents that are determined to be associated with a time sensitivity;

selecting the event from the predetermined event set based on the search query;

identifying the recommended contents from the retrieved contents, after applying the first filter and the second filter, based on the search query;

applying a semantic vector clustering function to the recommended contents to group the recommended contents into one or more elements, each element being associated with a feature of the event, each feature of the event corresponding to a search intent, each element including one or more sub-contents, and each sub-content being correlated to corresponding recommended contents; and providing the recommended contents in a structured template including the one or more elements.

2. The method of claim 1, wherein the feature of the event is any one of the followings:
topic relevant to the event;
critical moment of the event;
location associated with the event;
person involved in the event;
dominant subject relevant to the event;
representative document from mainstream media;
representative message from social network; and
multimedia information on the event.

3. The method of claim 1, wherein the one or more sub-contents at least comprises:
a key word derived from the corresponding recommended contents; and
extracted information obtained from each of the corresponding recommended contents.

4. The method of claim 1, wherein the structured template is presented based on a scale of the recommended contents.

5. The method of claim 1, wherein the structured template is presented with a color corresponding to a social sentiment on the event.

6. A method for providing recommended contents, comprising:
identifying an event based on a plurality of search queries which are spiking within a period;
identifying the recommended contents based on the search query;
calculating counts recommended contents related to the search query collected over a period of time;
ranking the recommended contents based on the counts;
applying a first filter to the recommended contents to remove contents that have a ranking outside a threshold;
applying a second filter to the recommended contents to remove contents that are determined to be associated with a time sensitivity;
determining one or more features of the event, each feature of the event corresponding to a search intent, the recommended contents being provided, after applying the first filter and the second filter, in a structured template including one or more elements by applying a semantic vector clustering function to the recommended contents, after applying the first filter and the second filter, to group the recommended contents into the one or more elements, each element of the one or more elements being associated with a feature of the event, and each element including one or more sub-contents; and
correlating each of the one or more sub-contents with a corresponding recommended content of the recommended contents.

7. The method of claim 6, wherein the one or more features of the event is any one of the following:
topic relevant to the event;
critical moment of the event;
location associated with the event;
person involved in the event;
dominant subject relevant to the event;
representative document from mainstream media;
representative message from social network; and
multimedia information on the event.

8. The method of claim 6, wherein the one or more sub-contents at least comprises:
a key word derived from corresponding recommended contents; and
extracted information obtained from each of the corresponding recommended contents.

9. The method of claim 6, wherein the event is identified by a consideration of periodic fluctuation.

10. The method of claim 6, wherein the event is identified by a consideration of time-sensitive search queries.

11. An apparatus for providing recommended contents, comprising:
at least one processor; and
memory including instructions that, when executed by the at least one processor, cause the at least one processor to perform operations to:
identify an event based on previous search query activity;
store the event in a predetermined event set;
receive a search query;
calculate counts for retrieved contents related to the search query collected over a period of time;
rank the retrieved contents based on the counts;
apply a first filter to the retrieved contents to remove contents that have a ranking outside a threshold;
apply a second filter to the retrieved contents to remove contents e determined to be associated with a time sensitivity;
select the event from the predetermined event set based on the search query;
identify, after application of the first filter and the second filter, the recommended contents from the retrieved contents based on the search query;
apply a semantic vector clustering function to the recommended contents to group the recommended contents into one or more elements, each element being associated with a feature of the event, each feature of the event corresponding to a search intent, each element including one or more sub-contents, and each sub-content being correlated to corresponding recommended contents; and
provide the recommended contents in a structured template including the one or more elements.

12. The apparatus of claim 11, wherein the feature of the event is any one of the followings:
topic relevant to the event;
critical moment of the event;
location associated with the event;
person involved in the event;
dominant subject relevant to the event;
representative document from mainstream media;
representative message from social network; and
multimedia information on the event.

13. The apparatus of claim 11, herein the one or more sub-contents at least comprises:
a key word derived from the corresponding recommended contents; and extracted information obtained from each of the corresponding recommended contents.

14. The apparatus of claim 11, wherein the structured template is presented based on a scale of the recommended contents.

15. The apparatus of claim 11, wherein the structured template is presented with a color corresponding to a social sentiment on the event.

16. An apparatus for providing recommended contents, comprising:
at least one processor; and
memory including instructions that, when executed by the at feast one processor, cause the at least one processor to perform operations to:
identify an event based on a plurality of search queries which are spiking within a period;
identify the recommended contents based on the search query;
calculate counts for the recommended contents related to the search query collected over a period of time;
ranking the recommended contents based on the counts;
applying a first filter to the recommended contents to remove contents that have a ranking outside a threshold;
applying a second filter to the recommended contents to remove contents that are determined to be associated with a time sensitivity;
determine one or more features of the event, each feature of the event corresponding to a search intent, the recommended contents being provided, after applying the first filter and the second filter, in a structured template including one or more elements by applying, after applying the first filter and the second filter, a semantic vector clustering function to the recommended contents to group the recommended contents into the one or more elements, each element of the one or more elements being associated with a feature of the event, and each element including one or more sub-contents; and
correlate each of the one or more sub-contents with a corresponding recommended content of the recommended contents.

17. The apparatus of claim 16, wherein the one or more features of the event is any one of the following:
topic relevant to the event;
critical moment of the event;
location associated with the event;
person involved in the event;
dominant subject relevant to the event;
representative document from mainstream media;
representative message from social network; and
multimedia information on the event.

18. The apparatus of claim 16, wherein the one or more sub-contents at least comprises:
a key word derived from corresponding recommended contents; and
extracted information obtained from each of the corresponding recommended contents.

19. The apparatus of claim 16, wherein the event is identified by a consideration of periodic fluctuation.

20. The apparatus of claim 16, wherein the event is identified by a consideration of time-sensitive search queries.

* * * * *